(12) United States Patent
Kobayashi et al.

(10) Patent No.: US 8,148,025 B2
(45) Date of Patent: Apr. 3, 2012

(54) SOLID POLYMER FUEL CELL

(75) Inventors: Kenji Kobayashi, Tokyo (JP); Shoji Sekino, Tokyo (JP)

(73) Assignee: NEC Corporation, Tokyo (JP)

( * ) Notice: Subject to any disclaimer, the term of this patent is extended or adjusted under 35 U.S.C. 154(b) by 314 days.

(21) Appl. No.: 12/312,815

(22) PCT Filed: Nov. 9, 2007

(86) PCT No.: PCT/JP2007/001230
§ 371 (c)(1),
(2), (4) Date: May 28, 2009

(87) PCT Pub. No.: WO2008/072363
PCT Pub. Date: Jun. 19, 2008

(65) Prior Publication Data
US 2010/0068587 A1    Mar. 18, 2010

(30) Foreign Application Priority Data
Dec. 11, 2006 (JP) ................................. 2006-333452

(51) Int. Cl.
*H01M 8/10* (2006.01)
*H01M 8/04* (2006.01)
(52) U.S. Cl. ........ 429/481; 429/490; 429/512; 429/513; 429/515
(58) Field of Classification Search .................. 429/414, 429/481, 506, 512, 513, 529, 530, 534
See application file for complete search history.

(56) References Cited

U.S. PATENT DOCUMENTS
2004/0209136 A1* 10/2004 Ren et al. ........................ 429/30
(Continued)

FOREIGN PATENT DOCUMENTS
JP    2000-106201    4/2000
(Continued)

OTHER PUBLICATIONS

Kobayashi et al. WO 2006/109645 A1. Oct. 19, 2006. Derwent Abstract.*

*Primary Examiner* — Basia Ridley
*Assistant Examiner* — James Lee
(74) *Attorney, Agent, or Firm* — McGinn IP Law Group, PLLC

(57) ABSTRACT

A solid polymer fuel cell includes a solid polymer electrolytic membrane 1, an anode 2 contacting one of the faces of the solid polymer electrolytic membrane 1, a cathode 3 contacting the other face of the solid polymer electrolytic membrane 1, and a gas-liquid separation membrane 4 enclosing a MEA 12 including the solid polymer electrolytic membrane 4, the anode 2, and the cathode 3, and which transmits gas but not liquid. An end face of the gas-liquid separation membrane 1 is sealed, and the MEA 12 is isolated from outside of the gas-liquid separation membrane 4. The anode 2 and the cathode 3 respectively include an electrode terminal extending from an end portion thereof, and the electrode terminal is exposed to outside of the gas-liquid separation membrane 4, through an end portion thereof. With such structure, a fuel is supplied in a form of vapor to the anode 2 through the gas-liquid separation membrane 4 opposing the anode 2, and a reaction product from the anode 2 is discharged through the gas-liquid separation membrane 4 located on a lateral side of the anode 2, and at least oxygen is supplied to the cathode 3 through the gas-liquid separation membrane 4 opposing the cathode 3.

18 Claims, 10 Drawing Sheets

U.S. PATENT DOCUMENTS

| | | | |
|---|---|---|---|
| 2005/0202309 A1* | 9/2005 | Nakagawa et al. | 429/49 |
| 2006/0014074 A1 | 1/2006 | Tsuji et al. | |
| 2007/0059575 A1 | 3/2007 | Kan et al. | |
| 2009/0202879 A1* | 8/2009 | Negishi et al. | 429/30 |

FOREIGN PATENT DOCUMENTS

| | | |
|---|---|---|
| JP | 2001-102070 | 4/2001 |
| JP | 2003-68330 | 3/2003 |
| JP | 2003-317773 | 11/2003 |
| JP | 2005-174804 | 6/2005 |
| JP | 2006-66140 | 3/2006 |
| JP | 2006-66198 | 3/2006 |
| JP | 2006-156198 | 6/2006 |
| JP | 2006-185629 | 7/2006 |
| JP | 2006-294366 | 10/2006 |
| JP | 2006-318708 | 11/2006 |
| JP | 2006-318712 | 11/2006 |
| JP | 2007-220443 | 8/2007 |
| WO | WO 2005/112172 A1 | 11/2005 |
| WO | WO 2005/122309 A1 | 12/2005 |
| WO | WO 2006/109645 A1 | 10/2006 |

* cited by examiner

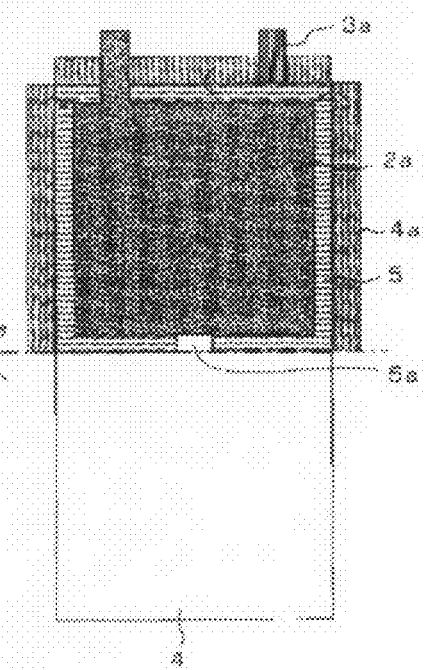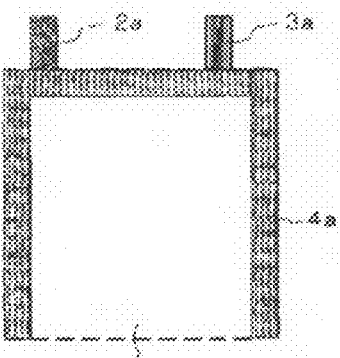
Fig. 8

Fig. 9
(a)
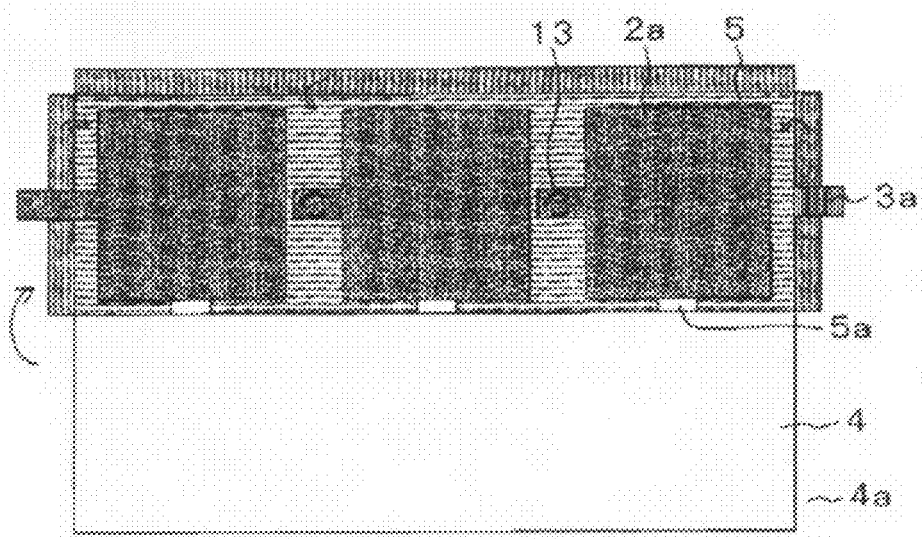
(b)
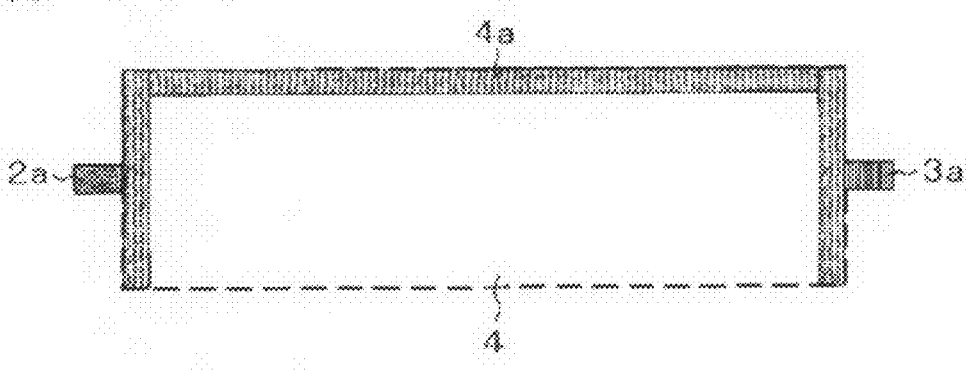

SOLID POLYMER FUEL CELL

TECHNICAL FIELD

The present invention relates to a solid polymer fuel cell that employs vaporized liquid fuel, and to a method of manufacturing the same.

BACKGROUND ART

Development of solid polymer fuel cells that employ alcohol fuel is being actively promoted for use as a power source for various electronic apparatuses including mobile phones, because such cells are easy to be made smaller in dimensions and lighter in weight. The development is primarily focused on solid polymer fuel cells that employ methanol fuel, owing to higher energy density thereby attained.

The solid polymer fuel cell includes a Membrane and Electrode Assembly (hereinafter, MEA), in which a solid polymer electrolytic membrane is interleaved between an anode and a cathode. The fuel cell that directly supplies the liquid fuel to the anode is called a direct-type fuel cell, in which the supplied liquid fuel is decomposed on a catalyst carried by the anode, so that positive ion, electron and an intermediate product are given. In the fuel cell of this type, the positive ion thus generated further migrates to the cathode through the solid polymer electrolytic membrane, while the generated electron migrates to the cathode through an external load, to be reacted with oxygen in the atmosphere on the cathode, thereby generating electricity. In the direct methanol fuel cell (hereinafter, DMFC) that employs, for example, methanol aqueous solution as it is as the liquid fuel, the reaction represented by the chemical formula (1) takes place on the anode, and the reaction represented by the formula (2) takes place on the cathode. As is apparent from these formulae (1) and (2), theoretically 1 mol of methanol and 1 mol of water are reacted on the anode to thereby give 1 mol of reaction product (carbon dioxide) on the DMFC, and since hydrogen ion and electron are also generated simultaneously, the theoretical concentration of methanol in the methanol aqueous solution, serving as the fuel, is approx. 70% in volume (vol. %).

$$CH_3OH+H_2O \rightarrow CO_2+6H^++6e^- \qquad (1)$$

$$6H^++6e^-+3/2O_2 \rightarrow 3H_2O \qquad (2)$$

It is known, however, that in the case where the fuel concentration becomes higher and hence a relatively larger amount of alcohol fuel is supplied to the anode than water, what is known as "cross-over effect" takes place in which the alcohol fuel is transmitted through the solid polymer electrolytic membrane without being involved in the reaction represented by the formula (1), to be reacted with the catalyst on the cathode, which results in decreased generation capacity and generation efficiency.

Examples of techniques that suppress the cross-over effect include providing a fuel vaporization layer constituted of a porous material or the like that vaporizes the liquid fuel on the upstream side of the anode of the MEA, to thereby supply the given vaporized liquid fuel (Ref. patent document 1). The patent document 1 states the advantage thereof as "Supplying thus the vaporized fuel allows maintaining the gas fuel in the fuel vaporization layer substantially saturated, and the liquid fuel is vaporized in the amount corresponding to the consumption of the gas fuel in the fuel vaporization layer for the cell reaction, and then the liquid fuel of the amount corresponding to the vaporized amount is introduced into the cell via capillary effect. Thus, since the fuel supply amount is linked with the fuel consumption, the fuel is scarcely discharged unreacted out of the cell, which does not require providing a processing system on the fuel outlet side as a conventional liquid fuel cell."

Also, the present inventors have discovered the drawback incidental to the patent document 1, in that the CO2 gas generated on the anode resides between the anode and the gas-liquid separation membrane, thereby impeding stable generation of power, and have proposed, as the solution thereof, a fuel cell that includes an outlet on a sealing material on the lateral side of the anode that facilitates efficiently discharging the generated $CO_2$ gas, and a system including such fuel cell (Ref. patent document 2).

Another drawback has come up, that in the case where the methanol concentration in the fuel is increased, water supply for the methanol becomes insufficient on the anode, which disables increasing the output. The present inventors have therefore developed a fuel cell that returns the water, generated on the cathode as shown by the formula (2), to the anode for utilization, and a system that employs such fuel cell. The present inventors have thus proposed, for example, a fuel cell and a fuel cell system having a MEA structure that includes a water repellent porous material on the cathode to thereby suppress the transpiration of the water generated on the cathode. Such structure allows a part of the water generated on the cathode to return to the anode, so that the shortage of water on the anode is resolved and thereby the output is increased.

Thus, employing the technique of vaporizing the liquid fuel and suppressing the transpiration of the water generated on the cathode enables attaining a high generation characteristic despite employing a high-concentration methanol fuel.

[Patent document 1] JP-A No. 2000-106201
[Patent document 2] JP-A No. 2006-318708

DISCLOSURE OF THE INVENTION

Problem to be Solved by the Invention

However, simply combining the foregoing three constituents of the fuel cell performing the respective functions complicates the MEA structure, which may incur disadvantages such as degradation in productivity and increase in cost. Besides, those constituents are independently provided and hence some portion of the MEA is exposed to outside, which facilitates the water and the product generated inside to leak outward, thereby incurring significant degradation in long-term generation characteristic and maintenance characteristic.

A first object of the present invention is to provide a vapor-feed fuel cell of a simplified structure that enables improving productivity and reducing the size and weight.

A second object of the present invention is to provide a fuel cell that suppresses outward leakage of products generated inside, to thereby significantly improve the long-term stability of the generation characteristic and the maintenance characteristic.

Means for Solving Problem

In a first viewpoint of the present invention, there is provided a solid polymer fuel cell, comprising a solid polymer electrolytic membrane, an anode disposed in contact with one of the faces of the solid polymer electrolytic membrane, a cathode disposed in contact with the other face of the solid polymer electrolytic membrane, and a gas-liquid separation membrane enclosing therein an assembly including the solid polymer electrolytic membrane, the anode, and the cathode, and which transmits gas but not liquid.

In a second viewpoint of the present invention, the solid polymer fuel cell includes a unit including the assemblies connected in series or parallel, and enclosed inside the gas-liquid separation membrane.

In the solid polymer fuel cell according to the present invention, it is preferable that an end face of the gas-liquid separation membrane is sealed, and the assembly is isolated from outside of the gas-liquid separation membrane.

In the solid polymer fuel cell according to the present invention, it is preferable that the assembly is enclosed in the gas-liquid separation membrane of a single sheet and folded, and an open end of the gas-liquid separation membrane is sealed.

In the solid polymer fuel cell according to the present invention, it is preferable that the anode and the cathode respectively include an electrode terminal extending from an end portion thereof, and the electrode terminal is exposed to outside of the gas-liquid separation membrane, through an end portion thereof.

It is preferable that the solid polymer fuel cell according to the present invention further comprises a microporous plate located on the gas-liquid separation membrane opposing the anode and the cathode.

In the solid polymer fuel cell according to the present invention, it is preferable that a fuel is supplied in a form of vapor to the anode through the gas-liquid separation membrane opposing the anode.

In the solid polymer fuel cell according to the present invention, it is preferable that a reaction product from the anode is discharged through the gas-liquid separation membrane located on a lateral side of the anode.

It is preferable that the solid polymer fuel cell according to the present invention further comprises a spacer having a thickness corresponding to each of the anode and the cathode, on a region of the respective faces of the solid polymer electrolytic membrane not covered with the anode and the cathode.

In the solid polymer fuel cell according to the present invention, it is preferable that the spacer provided on the side of the anode has an opening through which the reaction product from the anode is to be discharged.

In the solid polymer fuel cell according to the present invention, it is preferable that at least oxygen is supplied to the cathode through the gas-liquid separation membrane opposing the cathode.

It is preferable that the solid polymer fuel cell according to the present invention further comprises a moisture retention layer located between the cathode and the gas-liquid separation membrane opposing each other.

It is preferable that the solid polymer fuel cell according to the present invention further comprises a water repellent material or a hydrophilic porous material located between the anode and the gas-liquid separation membrane opposing each other.

Advantage of the Invention

The present invention allows manufacturing a vapor-feed fuel cell of a simplified structure in which a gas-liquid separation membrane encloses an assembly, to thereby improve the productivity and decrease the number of components, thus reducing the size and weight of the fuel cell. Moreover, a single component serves to perform the three functions of vaporizing the fuel to be supplied to the anode, which is essential in the vapor-feed fuel cell, discharging $CO_2$ gas from the anode, and suppression of transpiration of the generated water.

The structure that a single piece of gas-liquid separation membrane held therein seals the assembly facilitates minimizing the probability that a liquid product generated inside the assembly may leak outward, to thereby stabilize the fuel supply balance. Consequently, a high generation characteristic and maintenance characteristic can be secured over a long period of time, despite the very simple structure.

Also, the structure that inhibits the leakage of the liquid product provides a significant benefit from the viewpoint of safety and reliability, when applied to electronic apparatuses including mobile phones and laptop computers.

Further, the inverse diffusion of the generated water from the cathode to the anode is further encouraged, which facilitates achieving a stabilized generation characteristic and maintenance characteristic over a long period of time.

BRIEF DESCRIPTION OF THE DRAWINGS

The above and other objects, features and advantages will become more apparent through the following preferred embodiments and the accompanying drawings.

FIGS. 8(*a*) and 8(*b*) are schematic plan views sequentially showing a structure of a solid polymer fuel cell (single cell type) according to a third example of the present invention;

FIGS. 9(*a*) and 9(*b*) are schematic plan views sequentially showing a structure of a solid polymer fuel cell (serial unit type) according to the third example of the present invention.

BEST MODE FOR CARRYING OUT THE INVENTION

Figure 1:
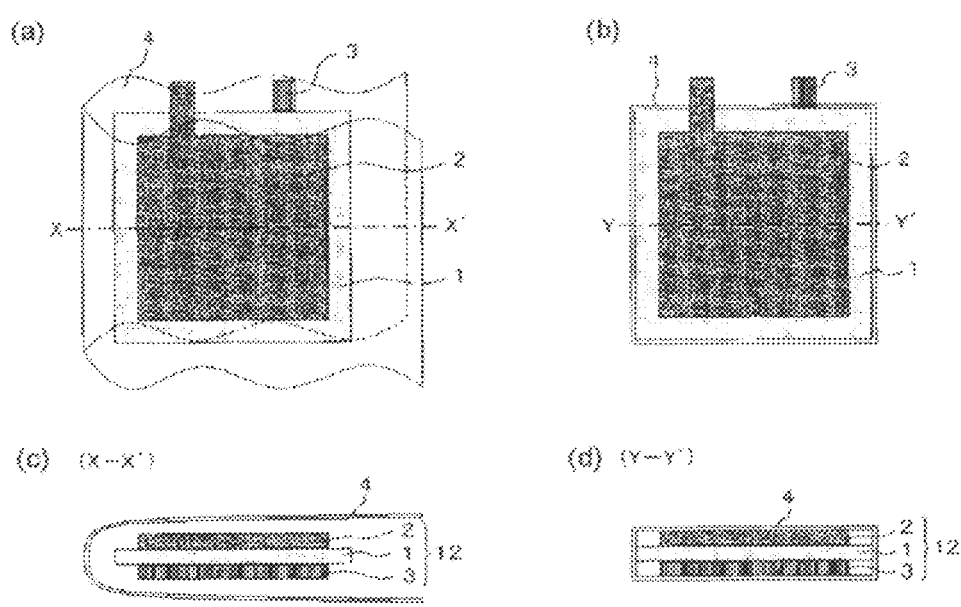
FIGS. 1(*a*) and 1(*b*) are plan views sequentially showing a cell of a solid polymer fuel cell according to an embodiment of the present invention, and FIGS. 1(*c*) and 1(*d*) are cross-sectional views corresponding to FIGS. 1(*a*) and 1(*b*) respectively.

Referring to the drawings, a solid polymer fuel cell according to an embodiment of the present invention will be described hereunder. FIGS. 1(a) to 1(d) are plan views and cross-sectional views sequentially showing a cell of a solid polymer fuel cell according to an embodiment of the present invention.

Figure 2:
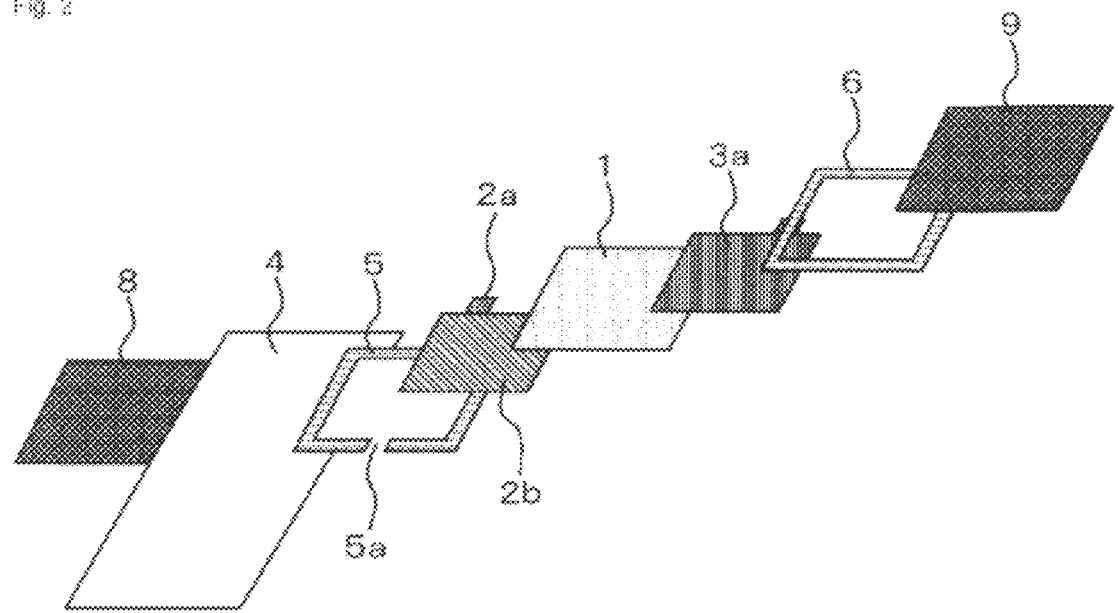
FIG. 2 is an exploded schematic perspective view showing a cell configuration of the solid polymer fuel cell according to the embodiment of the present invention.
Figure 3:
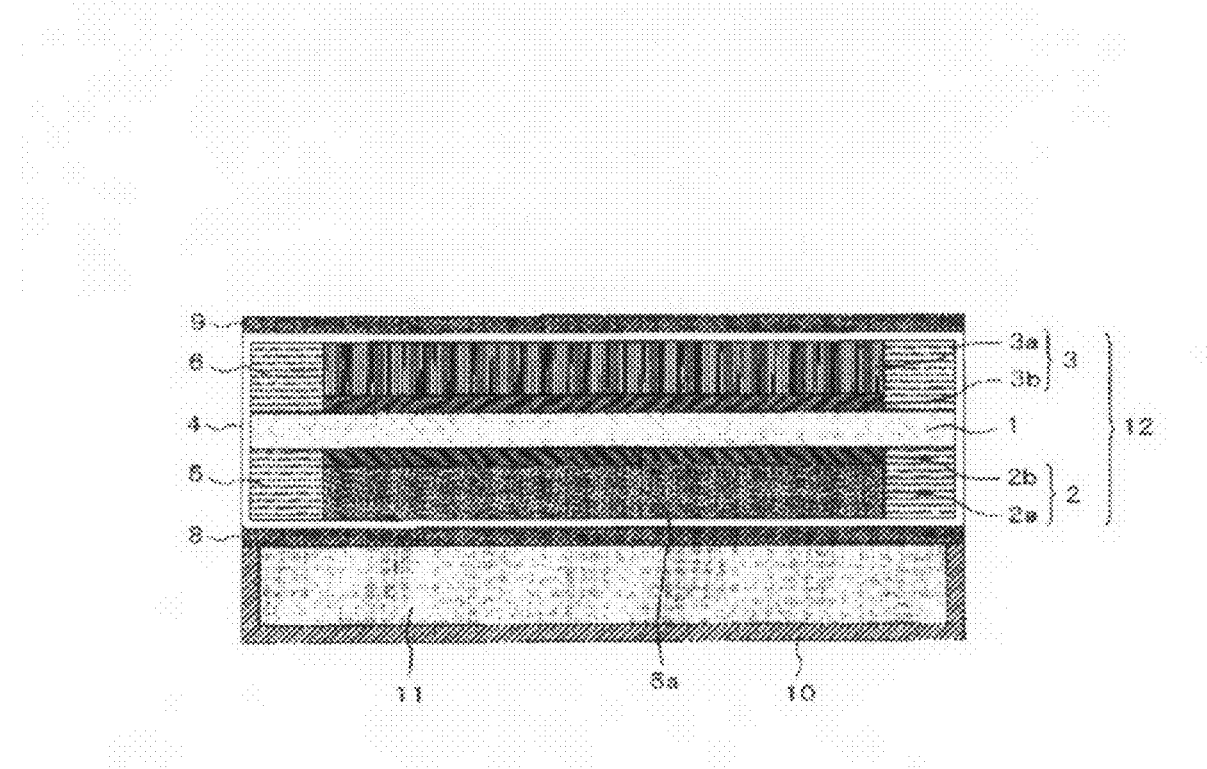
FIG. 3 is a cross-sectional view showing an assembled state of the cell of the solid polymer fuel cell according to the embodiment of the present invention.

FIG. 2 is an exploded schematic perspective view showing a cell configuration of the solid polymer fuel cell according to the embodiment of the present invention. FIG. 3 is a cross-sectional view showing an assembled state of the cell of the solid polymer fuel cell according to the embodiment of the present invention. It should be noted that the present invention is not limited to these drawings and to the embodiment described below.

The solid polymer fuel cell herein represents a basic concept of a cell structure that includes a MEA 12 including a solid polymer electrolytic membrane 1 interleaved between an anode 2 and a cathode 3, in which the MEA 12 is enclosed in a gas-liquid separation membrane 4 as shown in FIGS. 1(a) and 1(c), and an end portion (peripheral portion) of the gas-liquid separation membrane 4 is sealed as shown in FIGS. 1(b) and 1(d).

Although the material of the solid polymer electrolytic membrane 1 is not specifically limited, a commercially available product such as Nafion may be employed, which is also employed in a example to be subsequently described. The anode 2 and the cathode 3 are formed, as shown in FIGS. 2 and 3, by applying a catalyst paste (catalyst layer 2b, 3b) containing a carbon particle carrying a catalyst to one of the faces of a porous base 2a, 3a, constituted of a porous material such as a metal mesh or a carbon cloth. The anode 2 and the cathode 3 thus formed are oriented such that the face with the catalyst layer 2b, 3b confronts the solid polymer electrolytic membrane 1, and the anode 2, the cathode 3, and the solid polymer electrolytic membrane 1 held therebetween are thermo-compression bonded, so that the MEA 12 is obtained.

The porous bases 2a, 3a employed to constitute the anode 2 and the cathode 3 are respectively provided with an electrode terminal extending outward from an end portion thereof, to serve to introduce and draw electricity into and out of the anode 2 and the cathode 3. It is preferable that the electrode terminals of the anode 2 and the cathode 3 do not overlap. Preferably, the anode 2 and the cathode 3 may be formed as a unified member constituted of the porous base 2a, 3a and the catalyst layer 2b, 3b as shown in FIGS. 2 and 3, to further ensure that the structure is simplified. Here, the catalyst layer 2b, 3b is not provided on the electrode terminal of the anode 2 and the cathode 3.

It is also preferable that the solid polymer electrolytic membrane 1 is made slightly larger than the anode 2 and the cathode 3, so as to prevent a short circuit between the anode 2 and the cathode 3.

On a region of the both surfaces of the solid polymer electrolytic membrane 1 which is not covered with the anode 2 and the cathode 3, spacers 5, 6 respectively having the same thickness as the anode 2 and the cathode 3 are provided. The spacers 5, 6 are disposed along the perimeter of the anode 2 and the cathode 3 respectively, and diverted to be disposed on surfaces of the electrode terminal of the anode 2 and the cathode 3 that face the gas-liquid separation membrane 4 on a region of the electrode terminals of the anode 2 and the cathode 3 are present. Such configuration allows preventing a short circuit between the anode 2 and the cathode 3, and substantially suppressing permeation of the fuel through the anode 2 and the cathode 3. The spacers 5, 6 serve, as will be described later, as a gas outlet 5a of the anode 2, and are necessary in the bonding process with the gas-liquid separation membrane 4.

Although the material of the spacers 5, 6 is not specifically limited provided that the material has certain insulating and sealing capability, it is preferable to employ, for example, a silicone rubber, a resin such as PPS, or a polymeric porous material.

The spacer 5 provided on the side of the anode 2 includes an outlet 5a through which $CO_2$ gas generated on the anode 2 during the reaction is to be discharged. The outlet 5a may be formed by cutting away a portion of the spacer 5 or forming a fine through hole thereon. The aperture of the outlet 5a is to be appropriately determined according to the power to be generated (predicted $CO_2$ gas emission). The outlet 5a may be formed on all the four sides, however in order to ensure the integrity with the gas-liquid separation membrane 4 and the sealing effect after the sealing process, it is preferable to form the outlet 5a only on one side that is not sealed.

In the case where the spacers 5, 6 are constituted of a material difficult to be deformed, such as a flame-retardant material, the spacers may include an opening or a cutaway portion through which the electrode terminals of the anode 2 and the cathode 3 are led out to outside of the gas-liquid separation membrane 4. Such opening or cutaway portion may be made by forming a groove on the spacers 5, 6 according to the shape of the anode 2 and the cathode 3.

The shape of the MEA employed in this embodiment is not specifically limited, and a serial unit structure including a plurality of the foregoing MEAs 12 electrically connected in series in a plurality of stages, as well as a parallel unit structure including a plurality of MEAs 12 connected in parallel may be equally employed.

Figure 4:
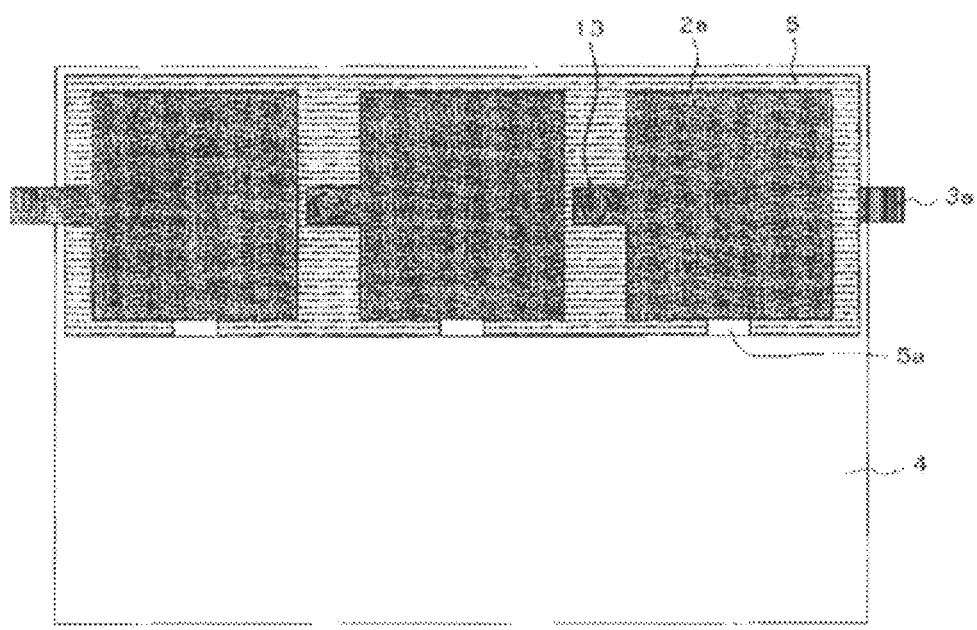
FIG. 4 is a schematic plan view showing a serial unit structure in which the cells of the solid polymer fuel cell according to the embodiment of the present invention are connected in series (with the gas-liquid separation membrane unfolded)
Figure 5:
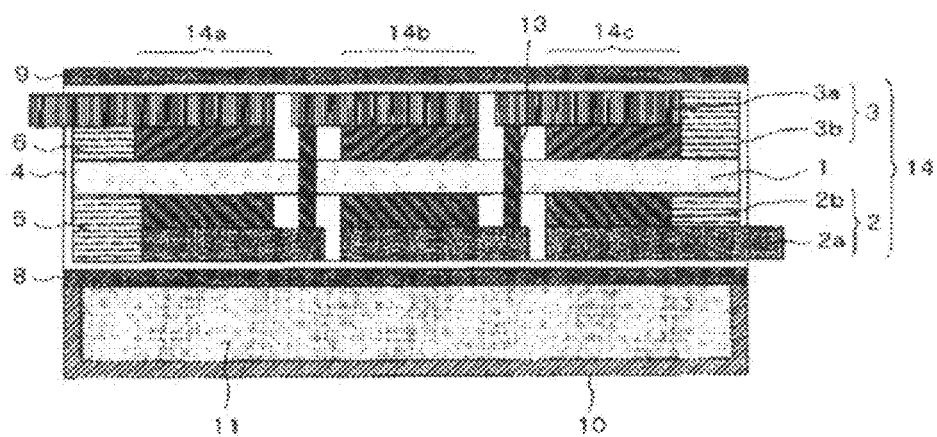
FIG. 5 is a schematic cross-sectional showing the serial unit structure in which the cells of the solid polymer fuel cell according to the embodiment of the present invention are connected in series (assembled state)

For example, FIGS. 4 and 5 are schematic plan views showing a serial unit structure in which the cells of the solid polymer fuel cell according to the embodiment of the present invention are connected in series, the former showing the state where the gas-liquid separation membrane 4 is unfolded, and the latter the state after the assembly. In these drawings, the anode 2 of a MEA 14a and the cathode 3 of an adjacent MEA 14b are electrically connected via an anode-cathode connector 13. The anode 2 of the MEA 14b and the cathode 3 of the adjacent MEA 14c are also electrically connected via an anode-cathode connector 13. In this case, an electrode terminal for power collection has to be provided at a terminating terminal (electrode terminal of the cathode 3 of the MEA 14a, and that of the anode 2 of the MEA 14c). The electrode terminal is exposed to the outside of the gas-liquid separation membrane 4, through the end portion thereof. Also, the solid polymer electrolytic membrane 1 is made larger than the anode 2 and the cathode 3, and the spacers 5, 6 are located on a region of the respective surfaces of the solid polymer electrolytic membrane 1 not covered with the anode 2 and the cathode 3. Here, the adjacent anodes 2 and the adjacent cathodes 3 have to be positioned so as to avoid a short circuit. Also, the spacer 5 on the side of the anode 2 is formed with the outlet 5a for $CO_2$ gas at the positions corresponding to each of the MEAs 14a, 14b, and 14c.

The MEA 12 (including the spacers 5, 6) thus constructed is enclosed in the gas-liquid separation membrane 4, of a single sheet and folded back, and three open sides of the gas-liquid separation membrane 4 along the MEA 12 are sealed (Ref. FIGS. 1(a) to 1(d)).

In this embodiment, suitable materials of the gas-liquid separation membrane 4 include chemically stable fluoric resins such as polytetrafluoroethylene (PTFE), however the material is not specifically limited provided that it is generally insulative and assures that a sufficient fuel supply can be secured.

In this embodiment, a moisture retention material (a moisture layer) constituted of a hydrophilic porous material or the like may be provided, if desired, over the face of the cathode 3 opposing the gas-liquid separation membrane 4 before enclosing the generating unit (assembly of the MEA 12 and the spacers 5, 6) with the gas-liquid separation membrane 4, so as to suppress the transpiration of the generated water. As the result such arrangement facilitates controlling the moisture retention with a simple structure. Examples of the moisture retaining material include a fiber mat, a hydrophilic cellulose fiber, a glass fiber and the like.

Similarly in this embodiment, the fuel is vaporized and supplied to the anode 2 through the gas-liquid separation membrane 4 contacting the anode 2. This is how the generation is started. Accordingly, a water repellent or a hydrophilic porous material may be provided, if desired, over the face of the anode 2 opposing the gas-liquid separation membrane 4, to thereby suppress the fuel permeation performance (adjust the fuel supply amount or fuel concentration). The water repellent porous material can be exemplified by a PTFE porous material. The hydrophilic porous material can be exemplified by a stylenedivinylbenzen-based film containing a hydrophilic group (sulfone group) and a Nafion film. Such configuration enables individually also controlling the gas permeability of the gas-liquid separation membrane 4 corresponding to each outlet 5a for $CO_2$ gas.

Figure 6:
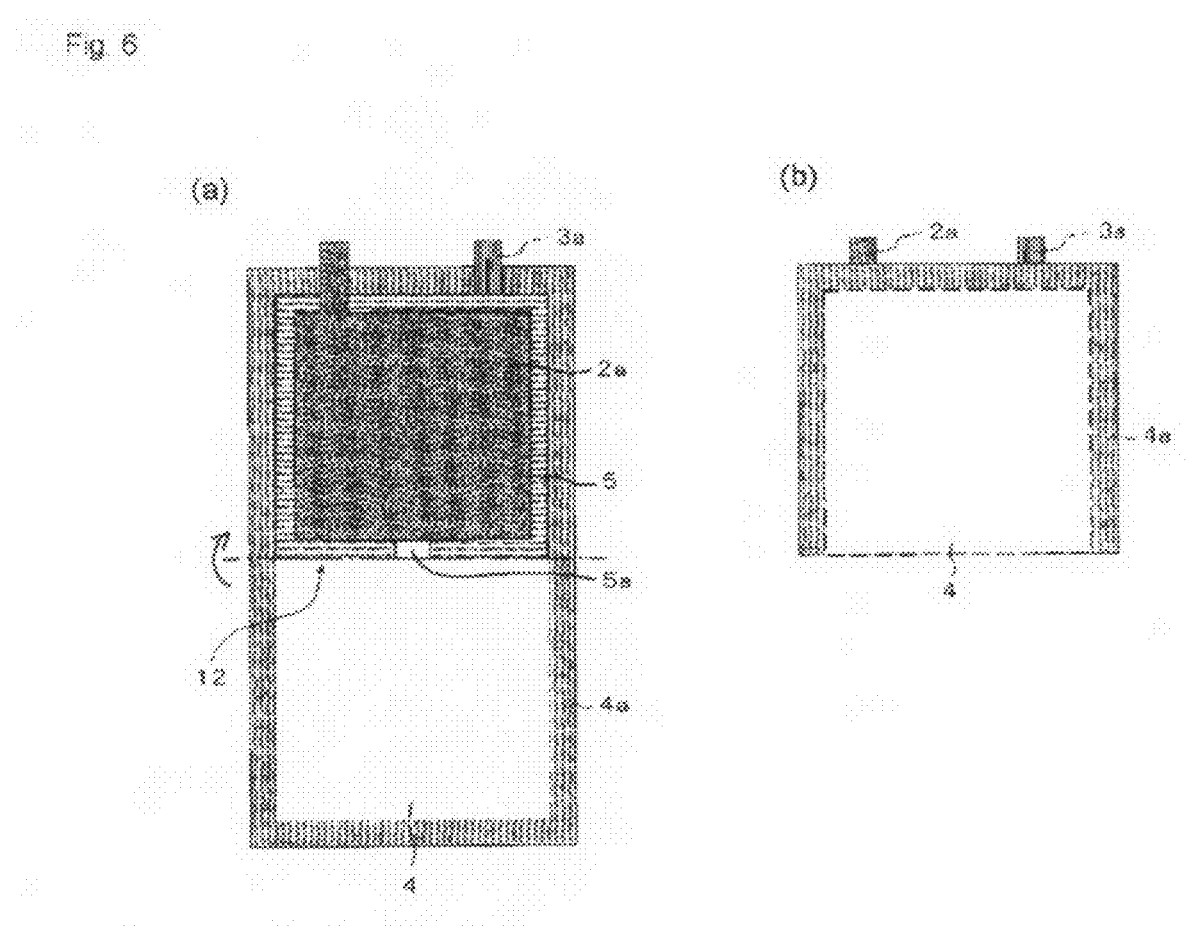
FIGS. 6(*a*) and 6(*b*) are schematic plan views sequentially showing a structure of a solid polymer fuel cell (single cell type) according to a first example of the present invention.

FIGS. 6(a) and 6(b) represent an example of the foregoing structure that the gas-liquid separation membrane 4 encloses the MEA 12 therein. In FIG. 6, the gas-liquid separation membrane 4 (FIG. 6(a)) is folded in half so as to enclose the MEA 12 (including the spacers 5, 6) as shown in FIG. 6(b), after which an adhesive or the like is applied to an adhesion margin 4a along the perimeter of the three open ends of the gas-liquid separation membrane 4 along the MEA 12, and the thermo-compression bonding is executed, so that the generating unit is obtained. In this case, it is preferable to form an outlet on the folding line of the gas-liquid separation membrane 4, at the position corresponding to the outlet 5a for $CO_2$ gas.

Here, although the generating unit may be directly attached to a fuel tank 10 as shown in FIG. 3 for executing the generation, the emergence of the reaction products when executing the generating may provoke an increase in internal pressure in the MEA 12, thereby expanding the gas-liquid separation membrane 4. Accordingly, a microporous plates 8, 9 may be provided in contact with the portion of the gas-liquid separation membrane 4 opposing the anode 2 and the cathode 3. Such structure resolves the foregoing issue.

Although the porosity of the microporous plates 8, 9 may be suitably determined so as to secure the fuel supply required for the specified generation, it is preferable that the porosity is 50% or less, to thereby serve as a suppressing plate. Also, the porosity of the plate on the anode 2 and that on the cathode 3 may be different. It is preferable to employ a material capable of insulating between the anode 2 and the cathode 3, or a material pre se coated with an insulative material, to form the microporous plates 8, 9.

The microporous plates 8, 9 may be bonded to the gas-liquid separation membrane 4 with an adhesive or the like, or may be thermo-compression bonded together with the MEA 12 enclosed in the gas-liquid separation membrane 4 and the fuel tank 10, to manufacture a cell of the fuel cell. That is how the fuel cell containing the single MEA 12 can be obtained (Ref. FIG. 3).

In the example shown in FIGS. 4 and 5, the gas-liquid separation membrane 4 formed as FIG. 7(a) is employed, such that the gas-liquid separation membrane 4 (FIG. 7(a)) is folded in half so as to enclose the MEA 14 (including the spacers 5, 6) as shown in FIG. 7(b), after which an adhesive or the like is applied to an adhesion portion along the perimeter of the three open ends of the gas-liquid separation membrane 4 along the MEA 14, and the thermo-compression bonding is executed, so that the generating unit is obtained. The microporous plates 8, 9 are then provided in contact with the portion of the gas-liquid separation membrane 4 opposing the anode 2 and the cathode 3, and the fuel tank 10 is attached on the side of the microporous plate 8. That is how the fuel cell including the serial unit structure MEA 14 can be obtained (Ref. FIG. 5).

EXAMPLES

Example 1

Hereunder, a solid polymer fuel cell according to the example 1 of the present invention will be described referring to a specific example. The single cell type solid polymer fuel cell shown in FIGS. 2 and 3 was made up through the following procedure (Ref. FIGS. 6(a) and 6(b)).

To form the cathode 3, firstly catalyst-carrying carbon fine particles, containing 55 wt. % of Pt fine particles of 3 to 5 nm in diameter in carbon particles (Ketjen Black EC600JD from Lion Corporation), were prepared, and an appropriate amount of 5 wt. % Nafion solution (Article No. DE521, "Nafion" is a registered trademark of E. I. du Pont de Nemours & Company (Inc.) was added to 1 g of the catalyst-carrying carbon fine particles and stirred, to thereby obtain a catalyst paste for the cathode (corresponding to the cathode catalyst layer 3b). The catalyst paste was applied to a metal porous base 3a at a rate of 1 to 8 mg/cm$^2$ and dried, thus to make up the cathode 3. For the porous base 3a, a metal mesh made of stainless steel according to SUS316L (0.5 mm thick, porosity 50%) was employed. The metal mesh was a square of 4×4 cm with an electrode terminal of 10 mm in length and 5 mm in width attached to an end portion, and the catalyst paste was applied to the metal mesh except for the electrode terminal.

To form the anode 2, a catalyst paste (corresponding to the catalyst layer 2b on the anode 2) was prepared through the same procedure as that for the catalyst paste for the cathode 3, except that Platinum (Pt)-Ruthenium (Ru) alloy fine particles of 3 to 5 nm in diameter were employed instead of the Pt fine particles. Then the anode 2 was made up through the same procedure as that for the cathode 3, except for employing the foregoing catalyst paste.

Then a film constituted of Nafion 117 from DuPont of 4.5 cm×4.5 cm in size and 180 µm in thickness was employed as the solid polymer electrolytic membrane 1. The cathode 3 was placed on one of the faces in the thicknesswise direction of the solid polymer electrolytic membrane 1, such that the porous base 3a was exposed, and the anode 2 was placed on the other face of the solid polymer electrolytic membrane 1 such that the porous base 2a was exposed, and such assembly was hot-pressed. The cathode 3 and the anode 2 were bonded to the solid polymer electrolytic membrane 1, and thereby the MEA 12 was obtained.

The spacers 5, 6, constituted of silicone rubber (rectangular frame shape of 45 mm in outer size, 0.5 mm in thickness, 5 mm in width) were then attached to a region on the respective faces of the solid polymer electrolytic membrane 1 of the MEA 12 not covered with the cathode 3 and the anode 2. Further, outlets 5a for $CO_2$ gas were formed on one of the sides of the spacer 5 around the anode 2, by cutting away 2 mm in width and 5 mm in length at three positions.

Then the MEA 12 with the spacers 5, 6 attached thereto is enclosed in the gas-liquid separation membrane 4 (PTFE porous film of 100 μm in thickness, 1 μm in pore diameter, 60% in porosity) of a size of 50 cm×95 cm, as shown in FIG. 6(a). In doing so, the gas-liquid separation membrane 4 was folded in half about the spacer 5 at the positions where the outlets 5a were provided (FIG. 6(b)).

A polyimide-based adhesive was then applied to the three open sides of the gas-liquid separation membrane 4 enclosing the MEA 12 (including the spacers 5, 6) having the width of 2.5 mm, and such portions were sealed by thermo-compression bonding.

The microporous plates 8, 9 (SUS316L, outer size 5 cm×5 cm, thickness 0.5 mm, porosity 30%, hole diameter 1 mm) were respectively placed on the surface of the anode 2 and the cathode 3 of the generating unit thus made up, and the fuel tank 10 was mounted on the microporous plate 8 on the side of the anode 2 and fixed with screws, thus to obtain a complete fuel cell. Here, the liquid fuel 11 is tightly enclosed so as not to leak outside, by a sealing material made of silicone rubber provided between the microporous plate 8 and the fuel tank 10, and by the microporous plate 8 and the gas-liquid separation membrane 4 opposing the microporous plate 8. The screws should be provided so as not to pierce the gas-liquid separation membrane 4.

According to the example 1, the number of work steps can be reduced, when compared with a comparative example (in which the gas-liquid separation membrane 4 was independently provided for each of the anode 2, the cathode 3, and the $CO_2$ gas outlet 5a of the MEA, and the assembly was combined with the fuel tank 10 with screws, and the gas-liquid separation membrane 4 was overlaid on the $CO_2$ gas outlet 5a, thus to form the fuel cell), because the gas-liquid separation membrane 4 is individually formed for each part and attached thereto.

Example 2

Hereunder, a solid polymer fuel cell according to the example 2 of the present invention will be described referring to a specific example. The solid polymer fuel cell of the serial unit structure shown in FIGS. 4 and 5 was made up through the following procedure (Ref. FIGS. 7(a) and 7(b)).

Firstly three pieces each of anodes 2 and cathodes 3 according to the example 1 were prepared. Then a film of Nafion 117 from DuPont was prepared as the solid polymer electrolytic membrane, in the size of 15 cm×5 cm and thickness of 180 μm. Regarding the solid polymer electrolytic membrane 1, the anode 2, and the cathode 3, the three anodes 2 were placed on one of the faces in the thickness direction of the solid polymer electrolytic membrane 1 such that the respective porous bases 2a were exposed as shown in FIG. 5, and such assembly was hot-pressed. In doing so, a positioning frame was employed on the solid polymer electrolytic membrane 1 so as to prevent the adjacent anodes 2 from being electrically connected. Then on the assembly of the anodes 2 and the solid polymer electrolytic membrane 1, a hole of 2 mm in diameter was formed at a position on the solid polymer electrolytic membrane corresponding to the electrode terminal of the respective anode 2, from the surface opposite to the anodes 2. The three cathodes 3 were then placed on the surface of the solid polymer electrolytic membrane 1 opposite to the anodes 2, such that the adjacent cathodes 3 were kept from being electrically connected, and such assembly was again hot-pressed.

To electrically connect the MEAs in the assembly thus made up, the electrode terminal of the anode 2 of a first MEA and that of the cathode 3 of the adjacent MEA were connected by spot-welding. In doing so, the holes of 2 mm in diameter formed on the solid polymer electrolytic membrane 1 so as to correspond to each electrode terminal were welded. At this stage, the serial unit structure MEA 14 including three MEAs was obtained.

Then the spacers 5, 6 made of a polypropylene porous material (porosity 50%) were placed on so as to cover an exposed region of the solid polymer electrolytic membrane 1.

Figure 7:
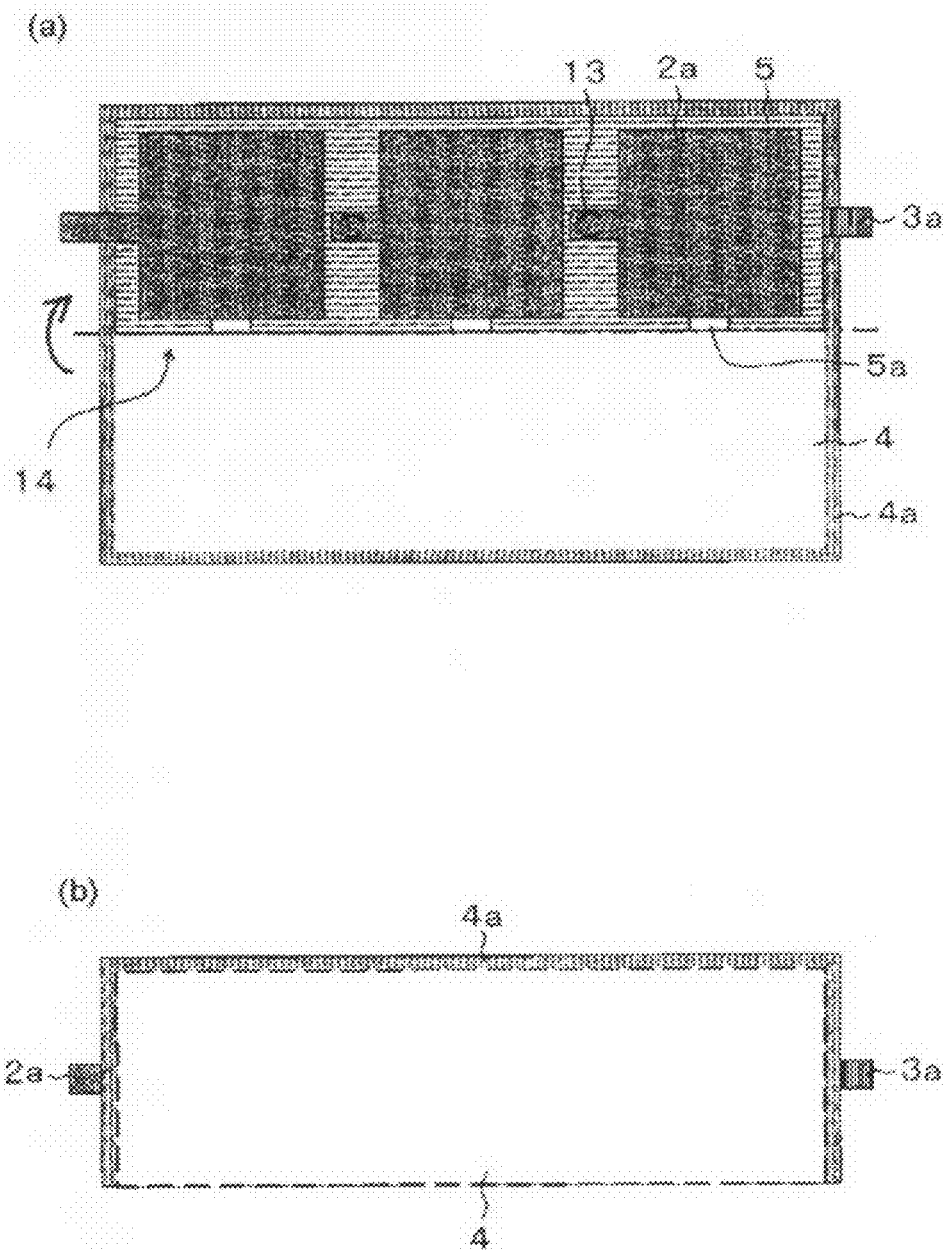
FIGS. 7(*a*) and 7(*b*) are schematic plan views sequentially showing a structure of a solid polymer fuel cell (serial unit type) according to a second example of the present invention.

The MEA 14 (including the spacers 5, 6) was placed on the gas-liquid separation membrane 4 in an orientation that the spacer 5 on the side of the anode 2 was aligned with the adhesion margin (FIG. 7(a)) as shown in FIG. 7, and enclosed by the gas-liquid separation membrane 4 (FIG. 7(b)). In doing so, the gas-liquid separation membrane 4 was folded in half about the spacer 5 at the positions where the outlets 5a were provided Then the microporous plate 8 (Ref. FIG. 5) was placed on the fuel tank 10 (Ref. FIG. 5), and the polyimide-based adhesive was applied to the region on the microporous plates 8, 9 (Ref. FIG. 5) corresponding to the spacers 5, 6, and such assembly in which the fuel tank 10 (Ref. FIG. 5), the microporous plates 8, 9 (Ref. FIG. 5), and the generating units were stacked was unified by thermo-compression bonding, thus to obtain a complete form of the generating cell.

Example 3

Hereunder, a solid polymer fuel cell according to the example 2 of the present invention will be described referring to a specific example. The single cell type solid polymer fuel cell shown in FIG. 3 was made up through the following procedure.

Firstly the MEA 12 (including the spacers 5, 6) was made up through a similar procedure to the example 1. Here, in the example 2 a polypropylene porous material (rectangular frame shape, outer size 45 mm, thickness 0.5 mm, width 5 mm, and porosity 50%) was employed as the spacers 5, 6.

Then the MEA 12 with the spacers 5, 6 attached thereto was enclosed in the gas-liquid separation membrane 4 with folding portions formed along the three sides so as to serve as the adhesion margins 4a (FIG. 8(a)) as shown in FIG. 8, and the adhesion margin 4a was folded toward the spacer 5 on the side of the anode 2, and the polyimide-based adhesive was then applied to the adhesion margin 4a and the assembly was sealed by thermo-compression bonding (FIG. 8(b)).

The microporous plate 8 (Ref. FIG. 3) was then placed on the fuel tank 10 (Ref. FIG. 3), and the polyimide-based adhesive was applied to the region on the microporous plates 8, 9 (Ref. FIG. 3) corresponding to the spacers 5, 6, and such assembly in which the fuel tank 10 (Ref. FIG. 3), the microporous plates 8, 9 (Ref. FIG. 3), and the generating units were stacked was unified by thermo-compression bonding, thus to obtain a complete form of the generating cell.

It is to be noted that the solid polymer fuel cell of the serial unit structure as shown in FIGS. 4 and 5 may also be enclosed in the gas-liquid separation membrane 4 with folding portions formed along the three sides so as to serve as adhesion margins 4a (FIG. 9(a)) as shown in FIG. 9, and then the adhesion margin 4a may be folded toward the spacer 5 on the side of the anode 2, and the polyimide-based adhesive may be applied to the adhesion margin 4a, to be followed by thermo-compression bonding for sealing (FIG. 9(b)), so as to make up the solid polymer fuel cell.

Example 4

Hereunder, explanation will be given on a constant current test executed with respect to the cell of the fuel cells according to the examples 1, 3 and the comparative example.

Figure 10:
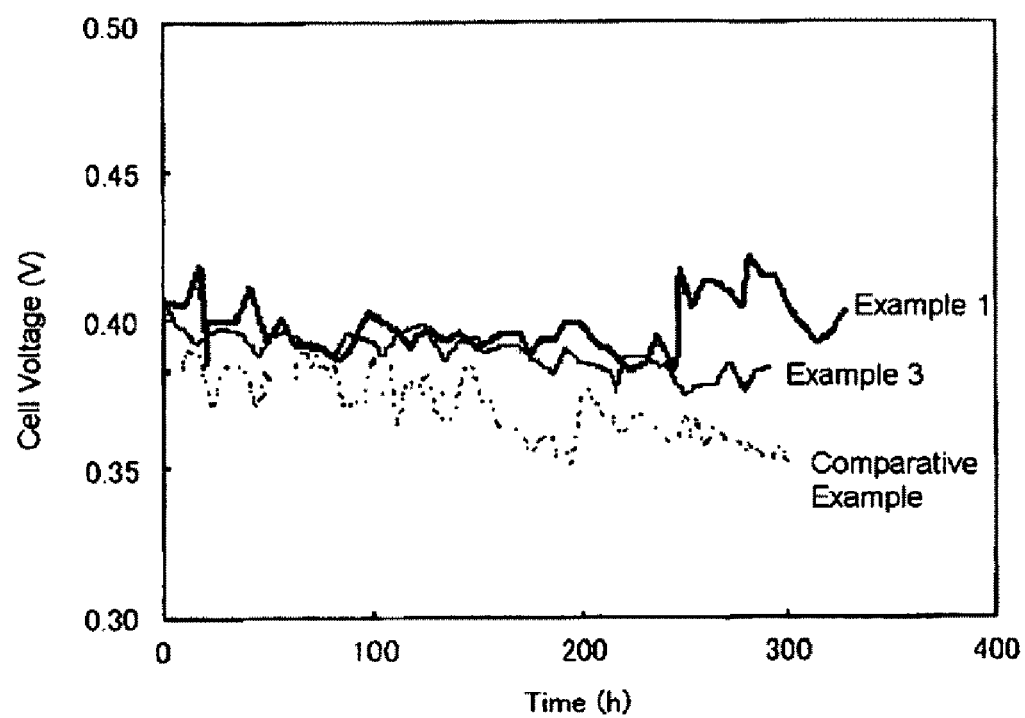
FIG. 10 is a graph showing a result of a long-term generation experiments based on a constant current test executed with the cell of the fuel cells made up according to the first and the third example and a comparative example.

FIG. 10 is a graph showing a result of a long-term generation experiments based on the constant current test executed with the cell of the fuel cells made up according to the examples 1, 3 and the comparative example. As the fuel, 1 liter of 30 vol. % methanol aqueous solution was circulated by a diaphragm pump at a flow rate of 10 ml/min. Also, the pump was temporarily stopped every 50 hours during the test, for fuel replacement in each occasion.

As a result, it has proved that while the examples 1, 3 exhibit stable generating performance the comparative example (in which the gas-liquid separation membrane 4 was independently provided for each of the anode 2, the cathode 3, and the $CO_2$ gas outlet 5a of the MEA, and the assembly was combined with the fuel tank 10 with screws, and the gas-liquid separation membrane 4 was overlaid on the $CO_2$ gas outlet 5a, thus to form the fuel cell) presents unstable generating performance such that after 100 hours the output largely fluctuates and the decline in output is also significant. Presumably, this is because the silicone rubber employed as the spacers 5, 6 (sealing material) deteriorated during the generation to thereby allow the screws to be loosened, and to provoke slight leakage of the fuel, such that the fuel directly flew to the anode 2 and the cathode 3 of the MEA, through the screw hole, which led to the unstable generating performance.

On the other hand, the example 1, which employed the screws for fixing, also incurred the loosening of the screws as in the comparative example, but the voltage was maintained. Presumably this is because the MEA 12 of the example 1 was enclosed in the gas-liquid separation membrane 4, which prevented the scarce amount of fuel that leaked, from directly flowing to the MEA. Further, the example 2, which was completely unified with the fuel tank 10, has proved to be free from the foregoing problem.

Thus, it has proved that the vapor-feed fuel cells made up as the examples 1 and 3 of the present invention can achieve a more stabilized generation characteristic, than the comparative example constituted from the combination of the conventional techniques. Moreover, since the fuel leakage is suppressed in the fuel cell of the present invention, the maintenance characteristic can also be significantly improved.

Example 5

Hereunder, the constant current test with respect to the cell of the fuel cell according to the example 2 will be described.

The constant current generation test was executed with the fuel cell of the serial unit structure made up as the example 2, under the same condition as that set for the example 4. As a result, the generated power has proved to be approx. 2.8 times as large as that of the single MEA cell made up as the example 3, and also stable generating performance was rendered. A presumable reason that the output did not reach three times as large as that of the single MEA cell is a decline in voltage due to the resistance at the connected portions. It has thus proved that the fuel cell of the serial unit structure according to the present invention can also achieve a high generation characteristic, despite the simplified structure.

The invention claimed is:

1. A solid polymer fuel cell comprising:
a solid polymer electrolytic membrane;
an anode disposed in contact with a face of said solid polymer electrolytic membrane;
a cathode disposed in contact with an other face of said solid polymer electrolytic membrane;
a gas-liquid separation membrane enclosing therein an assembly including said solid polymer electrolytic membrane, said anode, and said cathode, and which transmits gas but not liquid; and
a microporous plate located on each face of said gas-liquid separation membrane opposite to said anode and said cathode.

2. The solid polymer fuel cell according to claim 1, wherein a unit including a plurality of said assemblies connected in series or parallel is enclosed inside said gas-liquid separation membrane.

3. The solid polymer fuel cell according to claim 1, wherein an end face of said gas-liquid separation membrane is sealed, and said assembly is isolated from outside of said gas-liquid separation membrane.

4. The solid polymer fuel cell according to claim 1, wherein said assembly is enclosed in said gas-liquid separation membrane of a single sheet and folded, and an open end of said gas-liquid separation membrane is sealed.

5. The solid polymer fuel cell according to claim 1, wherein said anode and said cathode respectively include an electrode terminal extending from an end portion thereof, and said electrode terminal is exposed to outside of said gas-liquid separation membrane, through an end portion thereof.

6. The solid polymer fuel cell according to claim 1, wherein a fuel is supplied in a form of vapor to said anode through said gas-liquid separation membrane opposing said anode.

7. The solid polymer fuel cell according to claim 1, wherein a reaction product from said anode is discharged through said gas-liquid separation membrane located on a lateral side of said anode.

8. The solid polymer fuel cell according claim 1, further comprising a spacer having a thickness corresponding to each of said anode and said cathode, on a region of the respective faces of said solid polymer electrolytic membrane not covered with said anode and said cathode.

9. The solid polymer fuel cell according to claim 8, wherein said spacer provided on the side of said anode has an opening through which a reaction product from said anode is to be discharged.

10. The solid polymer fuel cell according claim 1, wherein at least oxygen is supplied to said cathode through said gas-liquid separation membrane opposing said cathode.

11. The solid polymer fuel cell according to claim 1, further comprising a moisture retention layer located between said cathode and said gas-liquid separation membrane opposing each other.

12. The solid polymer fuel cell according to claim 1, further comprising a water repellent material or a hydrophilic porous material located between said anode and said gas-liquid separation membrane opposing each other.

13. The solid polymer fuel cell according to claim 2, wherein an end face of said gas-liquid separation membrane is sealed, and said plurality of assemblies are isolated from outside of said gas-liquid separation membrane.

14. The solid polymer fuel cell according to claim 2, wherein said plurality of assemblies are enclosed in said gas-liquid separation membrane of a single sheet and folded, and an open end of said gas-liquid separation membrane is sealed.

15. The solid polymer fuel cell according to claim 3, wherein said assembly is enclosed in said gas-liquid separation membrane of a single sheet and folded, and an open end of said gas-liquid separation membrane is sealed.

16. The solid polymer fuel cell according to claim 2, wherein said anode and said cathode respectively include an electrode terminal extending from an end portion thereof, and said electrode terminal is exposed to outside of said gas-liquid separation membrane, through an end portion thereof.

17. The solid polymer fuel cell according to claim 3, wherein said anode and said cathode respectively include an electrode terminal extending from an end portion thereof, and said electrode terminal is exposed to outside of said gas-liquid separation membrane, through an end portion thereof.

18. The solid polymer fuel cell according to claim 4, wherein said anode and said cathode respectively include an electrode terminal extending from an end portion thereof, and said electrode terminal is exposed to outside of said gas-liquid separation membrane, through an end portion thereof.

* * * * *